US011639101B1

(12) United States Patent
Park et al.

(10) Patent No.: US 11,639,101 B1
(45) Date of Patent: May 2, 2023

(54) UNIVERSAL WHEEL DRIVING SYSTEM (71) Applicants: Hyundai Motor Company, Seoul (KR); Kia Corporation, Seoul (KR)

(72) Inventors: Jong Sool Park, Hwaseong-si (KR); Hyung Joon Lee, Hwaseong-si (KR); Jong Chan Park, Seongnam-si (KR); Jin Hyung Kong, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/895,577

(22) Filed: Aug. 25, 2022

(30) Foreign Application Priority Data

Mar. 29, 2022 (KR) .......................... 10-2022-0038688

(51) Int. Cl.
*B60K 17/04* (2006.01)
*F16H 1/28* (2006.01)
*F16H 57/00* (2012.01)
*F16H 57/08* (2006.01)

(52) U.S. Cl.
CPC ......... *B60K 17/046* (2013.01); *F16H 1/2863* (2013.01); *F16H 57/0006* (2013.01); *F16H 57/08* (2013.01)

(58) Field of Classification Search
None
See application file for complete search history.

(56) References Cited

U.S. PATENT DOCUMENTS

| | | | | |
|---|---|---|---|---|
| 5,322,141 A | * | 6/1994 | Brunner | B60K 7/0007 180/65.6 |
| 6,662,896 B1 | * | 12/2003 | Karlsson | B60K 17/344 180/371 |
| 9,505,299 B1 | * | 11/2016 | Eastman | B60R 16/08 |
| 2008/0153656 A1 | * | 6/2008 | Nerstad | F16F 15/123 475/346 |
| 2017/0016525 A1 | * | 1/2017 | Shaw | F16F 15/1206 |

FOREIGN PATENT DOCUMENTS

KR 10-2014-0062538 5/2014

* cited by examiner

*Primary Examiner* — Timothy Hannon
(74) *Attorney, Agent, or Firm* — Morgan, Lewis & Bockius LLP

(57) ABSTRACT

A universal wheel driving system includes a sun gear receiving power from a power source, a ring gear, of which a rotation axis moves relatively to a rotation axis of the sun gear on a rotation plane parallel to a rotation plane of the sun gear, the ring gear being concentrically connected to a wheel, a gear train allowing relative movement between the rotational axes of the sun and ring gears, and to generate a continuous power transmission between the sun and ring gears, a carrier forming the gear train, and supporting in position a rotation axis of a final pinion engaged with the ring gear constant with respect to the rotation axis of the ring gear, and a plurality of suspension modules providing shock-absorbing and damping during relative movements of the ring gear and carrier with respect to the sun gear.

21 Claims, 6 Drawing Sheets

UNIVERSAL WHEEL DRIVING SYSTEM

CROSS REFERENCE TO RELATED APPLICATION

The present application claims priority to Korean Patent Application No. 10-2022-0038688, filed Mar. 29, 2022, the entire contents of which is incorporated herein for all purposes by this reference.

BACKGROUND OF THE PRESENT DISCLOSURE

Field of the Present Disclosure

The present disclosure relates to a universal wheel driving system, and more particularly, to a driving system configured to receive power from a rotational power source such as a motor, etc and to output a changed rotation force to wheels in contact with the ground surface.

Description of Related Art

A vehicle driving system transmits power from a rotational power source such as an engine or a motor to wheels to drive the vehicle.

Recently, although an in-wheel motor type driving system in which a motor is provided directly on a driving wheel has been proposed, the in-wheel motor type driving system is not widely used due to the durability problem of the motor and the ride comfort problem due to the increase of unsprung mass.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a universal wheel driving system configured to receive power from a rotational power source such as a motor, etc and to output a changed rotation force, wherein the universal wheel driving system is configured to appropriately decelerate the speed of the input power and increase the torque of the input power to secure excellent performance in uphill driving and accelerating driving of a vehicle, to separately arrange the power source such as the motor, etc. from a wheel to which severe impacts and vibrations are applied to improve the durability of the power source and to reduce unsprung mass to secure excellent ride comfort, and to correspond to vertical movements of the wheel without using a universal joint, etc. to perform continuous power transmission from the power source, thus ultimately securing excellent utilization of a space between a left wheel and a right wheel due to reduction of a space between the power source and the wheel.

In various aspects of the present disclosure, there is provided a universal wheel driving system including: a sun gear configured to receive power from a power source mounted to a vehicle body; a ring gear, of which a rotation axis may be provided to move relatively to a rotation axis of the sun gear on a rotation plane parallel to a rotation plane of the sun gear, the ring gear being concentrically connected to a wheel; a gear train engaged to the sun gear and the ring gear and configured to allow relative movement between the rotational axes of the sun gear and the ring gear, and to generate a continuous power transmission state between the sun gear and the ring gear; a carrier configured to support a position of a rotation axis of a final pinion, which forms the gear train and is engaged with the ring gear, constant with respect to a position of the rotation axis of the ring gear; and at least one suspension module configured to provide shock-absorbing and damping during relative movements of the ring gear and the carrier with respect to the sun gear.

The gear train may include a plurality of links with a connected angle therebetween changed in response to a relative movement between the rotational axes of the sun gear and the ring gear.

The plurality of links may include a first link, a first end of which is connected to the rotation axis of the sun gear, and a second link connected to a second end of the first link; and a joint pinion with a same number of teeth as the sun gear may be provided at a connection portion of the first link and the second link.

The final pinion engaged with the ring gear may be provided in the second link; and the final pinion may have a same number of teeth as the sun gear.

The final pinion may be configured to transmit the power from the sun gear to the ring gear through a series of gears through the joint pinion.

The gear train may include a plurality of gear trains provided along a circumferential direction of the sun gear.

The plurality of links may include a first link, a first end of which is connected to the rotation axis of the sun gear, and a second link connected to a second end of the first link; and rotational axes of a series of gears may be provided in the first link and the second link to transmit the power from the sun gear to the ring gear.

Among the series of gears forming the gear train, gears located at even-numbered positions from the sun gear may have a same number of teeth as a number of teeth of the sun gear.

A gear located at a second position from the sun gear may be a joint pinion provided concentrically with rotational axes of the first link and the second link; and a gear located at a fourth position from the sun gear may be the final pinion engaged with the ring gear A first intermediate pinion of which a rotation axis may be provided in the first link may be engaged with the sun gear and the joint pinion; and a second intermediate pinion of which a rotation axis may be provided in the second link may be engaged with the joint pinion and the final pinion.

The gear train may include a plurality of gear trains along a circumferential direction of the sun gear; and each of final pinions of the gear trains may be configured to be supported by the carrier so that relative movement thereof may be maintained constant and only rotation thereof may be allowed.

The gear train may include at least four gears sequentially engaged with each other; and rotational axes of the gears may be rotatably supported by the plurality of links, respectively, the links being sequentially connected to each other.

The gear train may be configured to maintain a relative phase of the sun gear and the ring gear constant with respect to relative movement of the rotational axes of the sun gear and the ring gear.

Among the gears, the final pinion engaged with the ring gear may be configured to be supported by the carrier so that revolution thereof with respect to the sun gear may be constrained and only rotation thereof is allowed.

The power source may be fixed to the vehicle body; and the sun gear may be connected to the power source by an input shaft provided concentrically on a rotational axis of the power source.

A plurality of final pinions may be supported by the carrier; the input shaft may be connected to the sun gear through the carrier; and the carrier may have a space portion providing a space to prevent interference between the carrier and the input shaft.

The at least one suspension module may be elastically provided between the carrier and a sleeve allowing free rotation of the input shaft, and be provided to be extendible in a radial direction of the sun gear.

The at least one suspension module may include a shock absorber and a spring which may be provided in parallel with each other between the sleeve and the carrier.

The at least one suspension module may include at least three suspension modules provided to be spaced from each other in a circumferential direction of the sun gear.

The at least one suspension module may be provided on a straight line connecting the rotation axis of the final pinion and a center portion of the sleeve.

The universal wheel driving system may include: a sleeve fixed to the vehicle body, configured to support an input shaft transmitting the power to the sun gear, and allowing free rotation of the input shaft, wherein to provide shock-absorbing and damping when the ring gear and the carrier relatively move in vertical directions and longitudinal directions with respect to the vehicle body, the at least one suspension module may be provided between the sleeve and the carrier.

As described above, the universal wheel driving system is configured to appropriately decelerate the speed of the input power and increase the torque of the input power, securing excellent performance in uphill driving and accelerating driving of a vehicle, to separately arrange the power source such as the motor, etc. from a wheel to which severe impacts and vibrations are applied, improving the durability of the power source, to reduce unsprung mass, securing excellent ride comfort, to correspond to vertical movements of the wheel without using a universal joint, etc., performing continuous power transmission from the power source, and ultimately securing excellent utilization of a space between a left wheel and a right wheel due to reduction of a space between the power source and the wheel.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, the structural or functional description specified to exemplary embodiments according to the concept of the present disclosure is intended to describe the exemplary embodiments of the present disclosure, so it should be understood that the present disclosure may be variously embodied, without being limited to the exemplary embodiments of the present disclosure.

Embodiments described herein may be changed in various ways and various shapes, so specific embodiments are shown in the drawings and will be described in detail in the present specification. However, it should be understood that the exemplary embodiments according to the concept of the present disclosure are not limited to the embodiments which will be described hereinbelow with reference to the accompanying drawings, but all of modifications, equivalents, and substitutions are included in the scope and spirit of the present disclosure.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be directly connected to or directly coupled to another element or be connected to or coupled to another element, having the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent", or "directly adjacent" should be interpreted in the same manner as those described above.

The terminology used herein is for describing various exemplary embodiments only and is not intended to limit the present disclosure. Singular forms are intended to include plural forms unless the context clearly indicates otherwise. It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which an exemplary embodiment of the present disclosure belongs. It must be understood that the terms defined by the dictionary are identical with the meanings within the context of the related art, and they should not be ideally or excessively formally defined unless the context clearly dictates otherwise.

Exemplary embodiments will be described hereafter in detail with reference to the accompanying drawings. Like reference numerals provided in the drawings indicate like components.

Referring to FIG. 1, FIG. 2, FIG. 3, FIG. 4, and FIG. 5, according to exemplary embodiments of the present disclosure, a universal wheel driving system commonly includes: a sun gear S configured to receive power from a power source mounted to a vehicle body BD; a ring gear R, wherein on a rotation plane in parallel with a rotation plane of the sun gear S, a rotation axis thereof is provided to move relatively to a rotation axis of the sun gear S, and a wheel W is concentrically connected thereto; a gear train 1 configured to allow the rotational axes of the sun gear S and the ring gear R to move relatively to each other, and to generate a continuous power transmission between the sun gear S and the ring gear R; a carrier C configured to support a position of a rotation axis of a final pinion 9, which forms the gear train 1 and is engaged with the ring gear R, constant with respect to a position of the rotation axis of the ring gear R; and a plurality of suspension modules SM configured to provide shock-absorbing and damping during relative movements of the ring gear R and the carrier C with respect to the sun gear S.

In other words, according to the exemplary embodiments of the present disclosure, the wheel W is connected to the ring gear R to be brought into contact with a road surface, the sun gear S is connected to the power source mounted to the vehicle body BD to receive power, and shock-absorbing and damping are performed when the carrier C moves relatively to the sun gear S through the suspension modules SM.

The carrier C supports a position of the rotation axis of the final pinion 9 engaged with the ring gear R constant with respect to a position of the rotation axis of the ring gear R, restricting relative translation movement of the ring gear R. Accordingly, when the wheel W and the ring gear R move upward and downward with respect to the sun gear S, the carrier C moves upward and downward together with the ring gear R.

The sun gear S is connected to an input shaft IS supported by a sleeve SL fixed to the vehicle body BD while maintaining a concentric state, the wheel W, the ring gear R, and the carrier C that move upward and downward with respect to the sun gear S consequently move upward and downward with respect to the vehicle body BD.

Furthermore, according to the exemplary embodiments of the present disclosure, the rotational axes of the sun gear S and the ring gear R are provided to remain in parallel to each other to allow relative displacements thereof, and the gear train 1 maintains a state in which continuous power transmission is possible between the sun gear S and the ring gear R even in the relative displacements of the sun gear S and the ring gear R.

The gear train 1 includes a plurality of links of which a connected angle is changed in response to relative movement between the rotational axes of the sun gear S and the ring gear R.

The plurality of links includes a first link 3 connected to the rotation axis of the sun gear S and a second link 5 connected to the first link 3. Rotational axes of a series of gears are provided in the first link 3 and the second link 5 to transmit power from the sun gear S to the ring gear R. A joint pinion 7 with the same number of teeth as the number of teeth of the sun gear S is provided in a connection portion of the first link 3 and the second link 5.

The final pinion 9 engaged with the ring gear R is provided in an end of the second link 5, and the final pinion 9 has the same number of teeth as the number of teeth of the sun gear S.

Therefore, the final pinion 9 may transmit power to the ring gear R by the series of gears provided from the sun gear S through the joint pinion 7, and all the sun gear S, the joint pinion 7, and the final pinion 9 have the same number of teeth.

As described above, among the series of gears forming the gear train 1, both the joint pinion 7 and the final pinion 9 that are gears located at even-numbered positions from the sun gear S should have the number of teeth equal to the sun gear S, a relative phase of the sun gear S and the ring gear R is not changed, relative movement of the ring gear R with respect to the sun gear S, and a continuous constant power transmission are maintained between the sun gear S and the ring gear R.

A first intermediate pinion 11 of which a rotation axis is provided in the first link 3 is engaged with both the sun gear S and the joint pinion 7, and a second intermediate pinion 13 of which a rotation axis is provided in the second link 5 is engaged with both the joint pinion 7 and the final pinion 9.

Therefore, power from the sun gear S may be transmitted to the ring gear R through the first intermediate pinion 11, the joint pinion 7, the second intermediate pinion 13, and the final pinion 9 in order.

Figure 1:
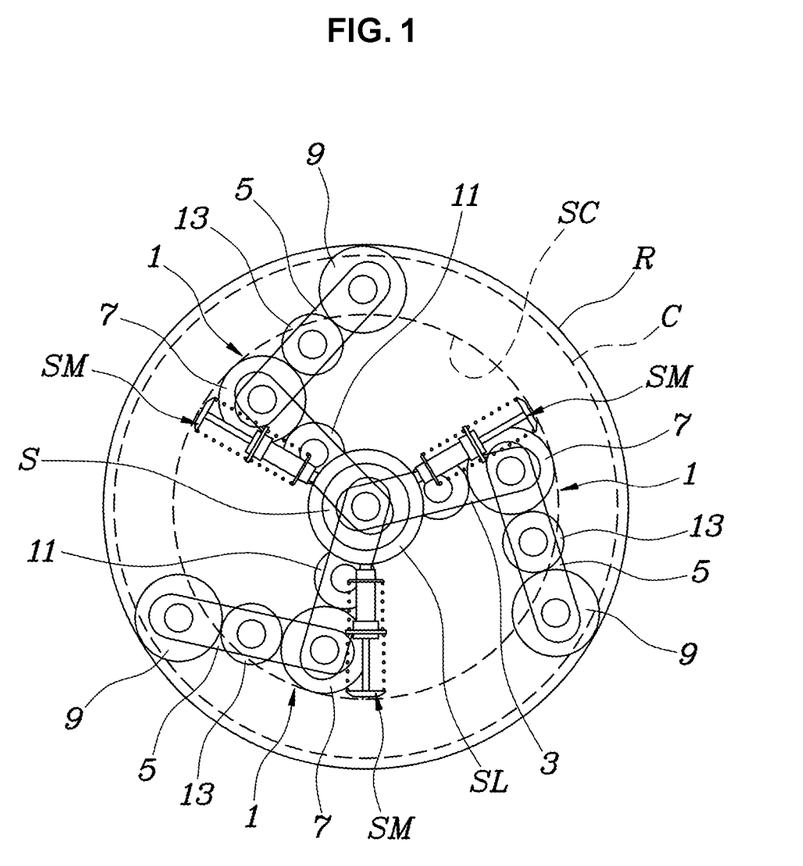
FIG. 1 is a view showing a universal wheel driving system according to various exemplary embodiments of the present disclosure.
Figure 5:
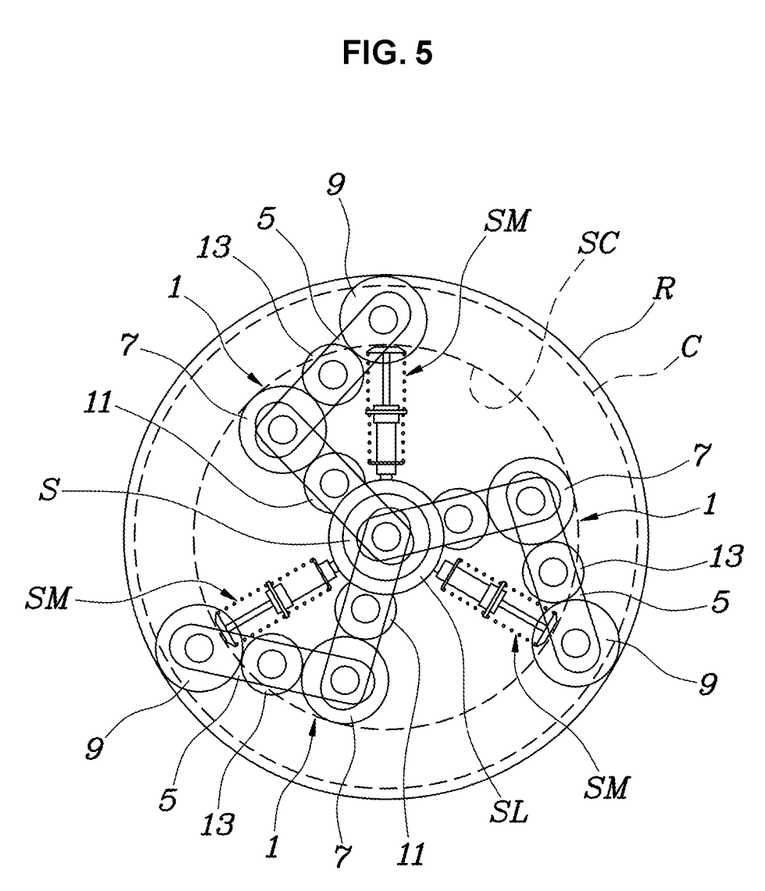
FIG. 5 is a view showing the universal wheel driving system according to various exemplary embodiments of the present disclosure.

As the exemplary embodiments shown in FIGS. 1 and 5, a plurality of gear trains 1 may be provided in a circumferential direction of the sun gear S, and final pinions 9 of the plurality of gear trains 1 are maintained at relative positions constant and are rotatably supported by the carrier C so that only rotation thereof is allowed.

In various exemplary embodiments as shown in FIG. 1, FIG. 2, FIG. 3, and FIG. 4, 3 gear trains 1 are provided axially-symmetrically on the rotation axis of the sun gear S, 3 final pinions 9 are engaged with the ring gear R. Rotational axes of the final pinions 9 are supported by the carrier C, maintaining constant a position of the rotation axis of the ring gear R with respect to the carrier C.

Therefore, when the wheel W connected to the ring gear R moves upward and downward, the final pinion 9 and the carrier C move upward and downward together with the wheel, and upward and downward movements of the carrier C with respect to the sun gear S is buffered and damped down by the suspension modules SM.

In the exemplary embodiment of the present disclosure, the suspension modules SM are provided between the sleeve SL and the carrier C, and includes a suspension module SM provided lengthily downwards from the sleeve SL, and suspension modules SM provided lengthily upwards from opposite portions of the sleeve SL, stably supporting relative movement of the carrier C with respect to the sleeve SL.

Not only vertical relative movements of the carrier C with respect to the sun gear S and the sleeve SL, but also longitudinal relative movements thereof are buffered and damped down by the suspension modules SM provided in the three directions.

Meanwhile, in various exemplary embodiments shown in FIG. 5, like the various exemplary embodiments of the present disclosure, the three gear trains 1 are provided axially-symmetrically on the rotation axis of the sun gear S, and the three gear trains 3 are provided to be spaced from each other in the circumferential direction of the sun gear S, and a state in which the three final pinions 9 are engaged with the ring gear R is stably maintained by the carrier C.

However, according to the various exemplary embodiments of the present disclosure, there is a difference from the various exemplary embodiments of FIG. 1 so that the suspension modules SM is provided lengthily on a straight line connecting a rotation axis of the final pinion 9 to the center portion of the sleeve SL.

Therefore, when the ring gear R and the carrier C move relatively to the sun gear S, the suspension modules SM performs a shock-absorbing effect to be proportional to a displacement depending on the relative movements of the sun gear S and the final pinion 9.

Figure 3:
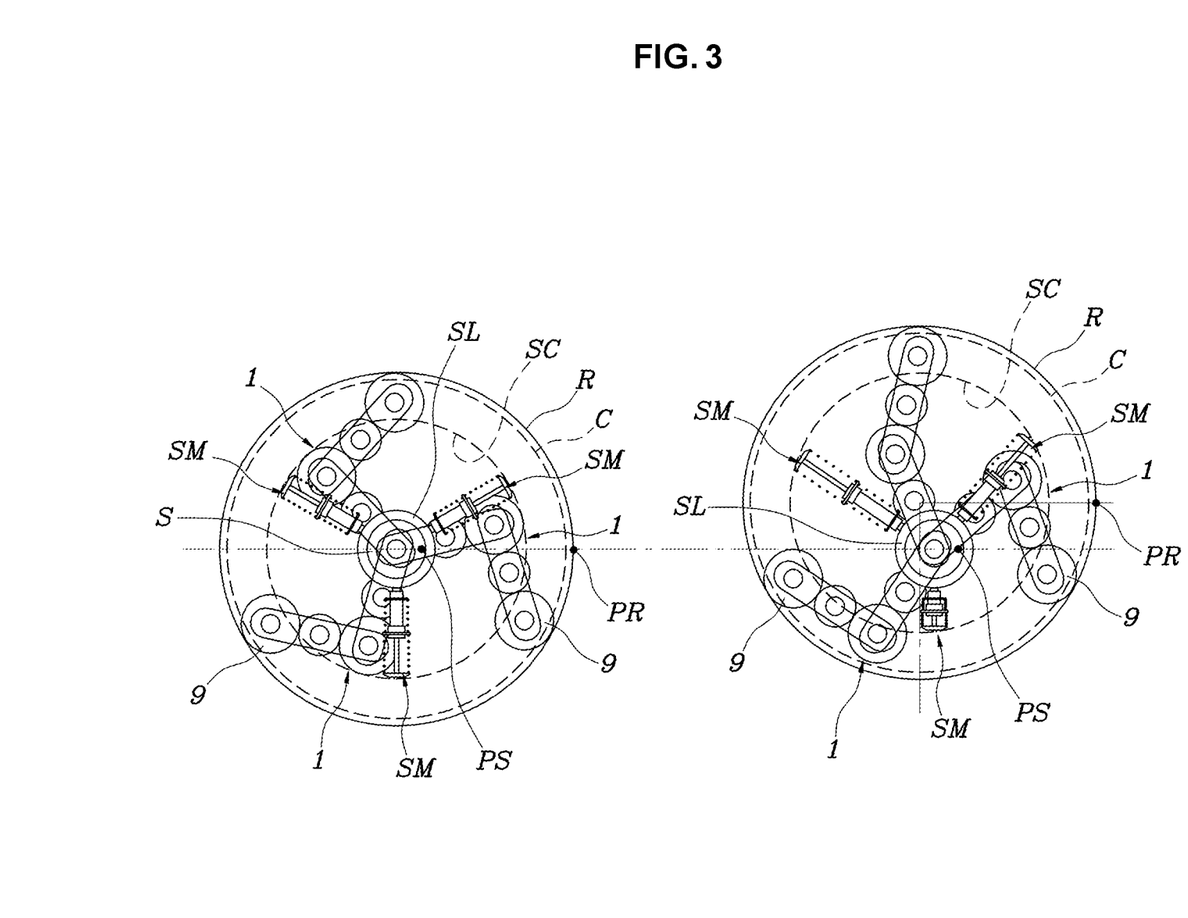
FIG. 3 is a view showing the ring gear moving upward in comparison to FIG. 1.
Figure 4:
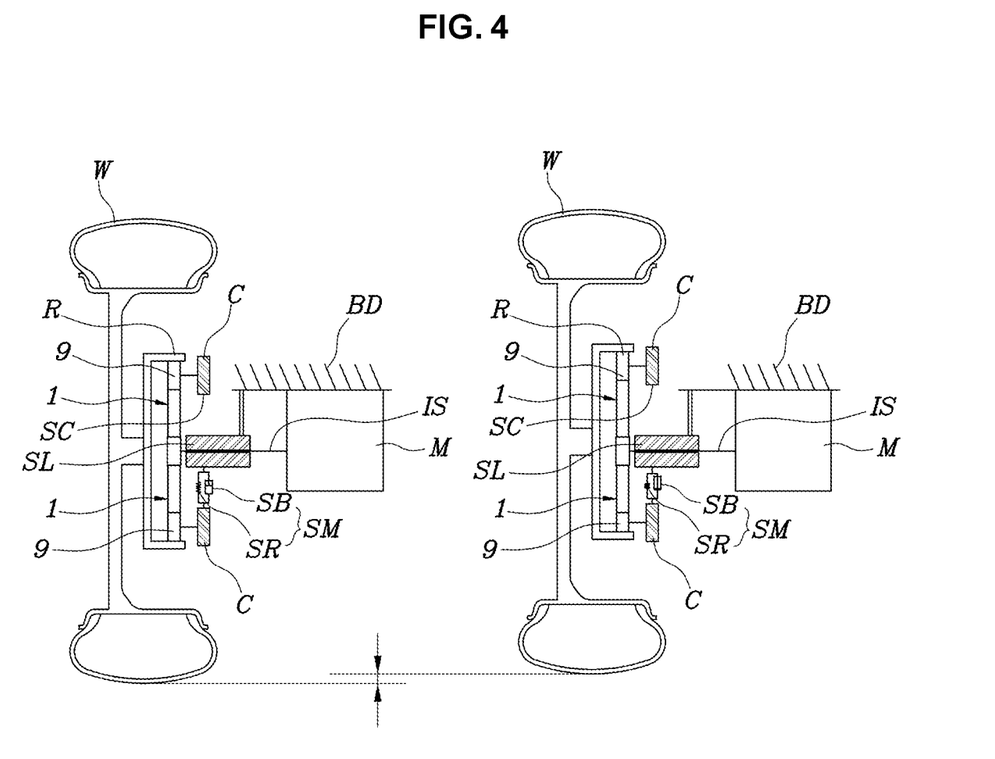
FIG. 4 is a view showing the ring gear of FIG. 3 in comparison to a view point of FIG. 1.

Referring to FIG. 3 and FIG. 4, with upward and downward movements of the ring gear R with respect to the sun gear S, as an angle between the first link 3 and the second link 5 of each of the gear trains 1 is changed, the first intermediate pinion 11 continuously maintains an engaged state with the sun gear S, and the final pinion 9 continuously maintains an engaged state with the ring gear R. Accordingly, continuous power transmission between the sun gear S and the ring gear R may be performed.

With relative movements of the rotational axes of the sun gear S and the ring gear R, the gear train 1 is configured to maintain the relative phase of the sun gear S and the ring gear R constant.

Herein, maintaining the relative phase of the rotational axes of the sun gear S and the ring gear R constant with respect to the relative movements thereof is expressed, as shown in FIG. 3, that rotational phase of points (PS, PR) respectively marked at 0 positions of the sun gear S and the ring gear R maintains the 0 positions constant even when the ring gear R moves upward and downward with respect to the sun gear.

In other words, when the rotational axes of the sun gear S and the ring gear R perform translation movement on the same plane, the sun gear S and the ring gear R are not relatively rotated due to the translation movement itself.

In the above configuration, when a vehicle wheel moves upward and downward along a vertical curvature of a road surface, even when the ring gear R connected to the wheel moves upward and downward, additional rotation of the sun gear S generated by the vertical movements may not be generated, and furthermore, sun gear torque control is easily and stably performed by torque control of the motor connected to the sun gear S.

As described above, to maintain the relative phase between the sun gear S and the ring gear R constant when the ring gear R moves upward and downward with respect to the sun gear S, among the series of gears forming the gear train 1, the joint pinion 7 and the final pinion 9, i.e., gears located at even-numbered positions from the sun gear S, should have the same number of teeth as the number of teeth of the sun gear S.

Figure 2:
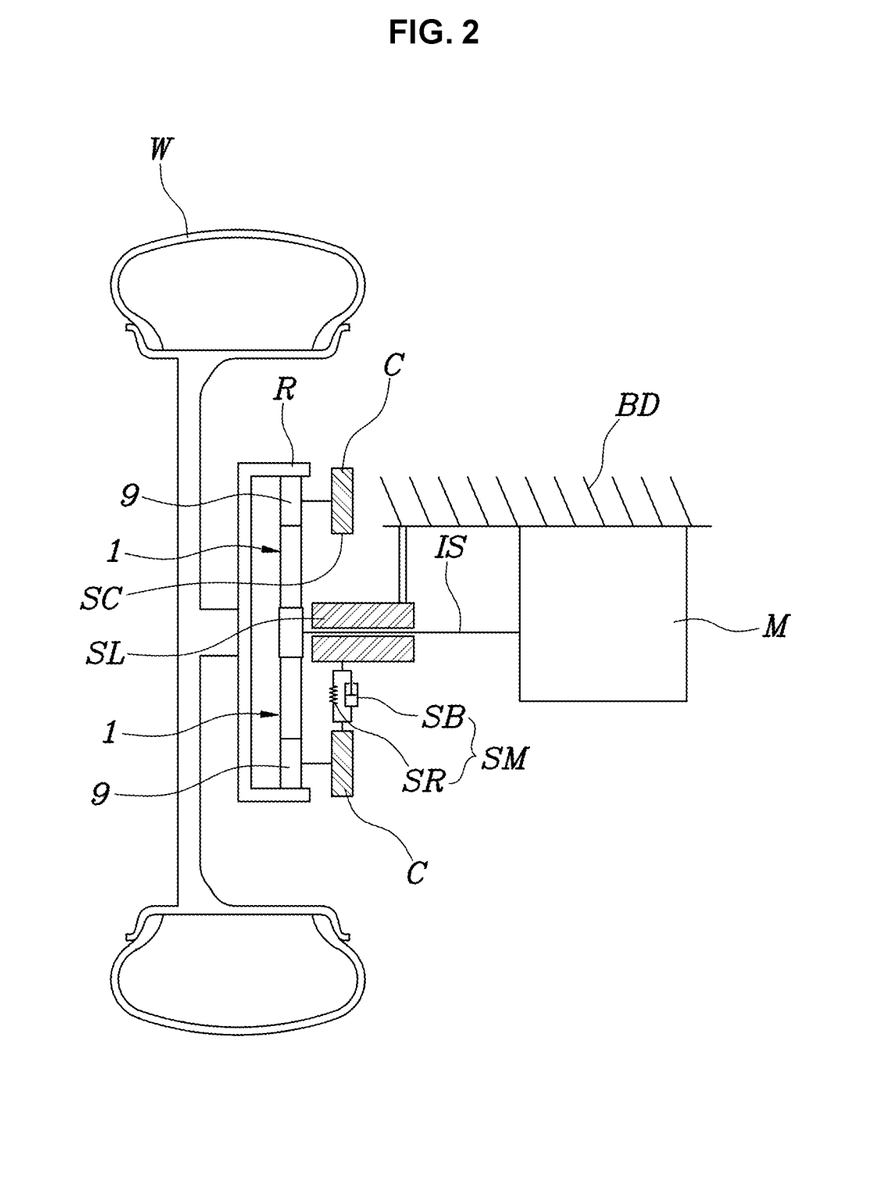
FIG. 2 is a side view showing the universal wheel driving system shown in FIG. 1.

Referring to FIGS. 2 and 4, a motor M, i.e., the power source, is fixed to the vehicle body BD, and the sun gear S is connected to the motor M by an input shaft IS concentrically provided at the rotation axis of the motor M. The wheel W is connected to the ring gear R, and the carrier C is supported to be movable upward and downward with respect to the sun gear S.

In the present state, when a vehicle is driven by power of the motor M, and the wheel W, the ring gear R, and the carrier C move upward and downward with respect to the sun gear S, the present disclosure maintains the relative phase between the sun gear S and the ring gear R constant to prevent surging or pitching of the vehicle, and to allow power, which is transmitted from the motor M to the wheel W through the sun gear S, the gear train 1, and the ring gear R in order, to be continuously and stably transmitted.

For reference, the gear train 1 and the suspension modules SM shown in FIGS. 2 and 4 are conceptually expressed for easier understanding without being bound by the state in FIG. 1.

Figure 6:
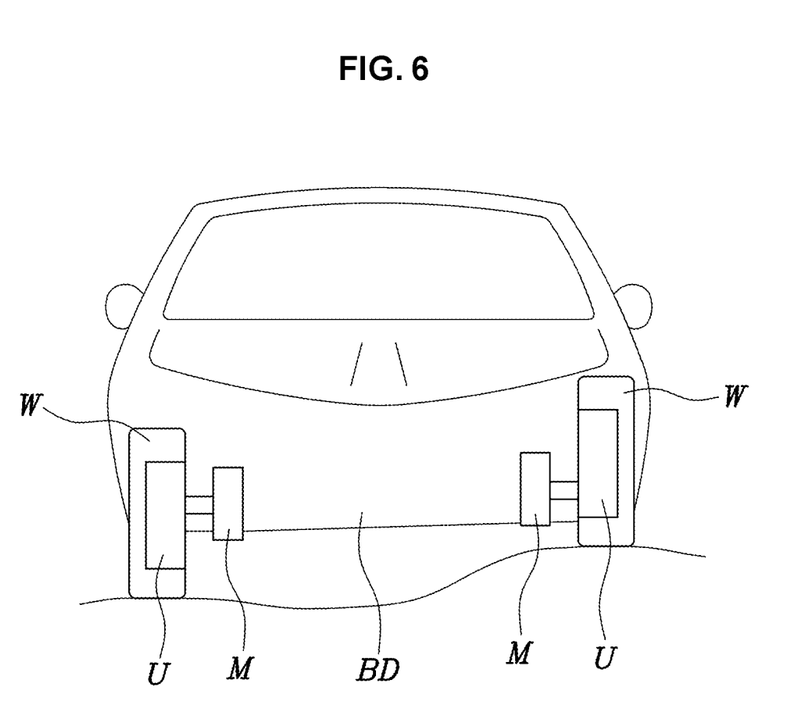
FIG. 6 is a view in showing the universal wheel driving system according to an exemplary embodiment of the present disclosure applied in a vehicle.

For reference, 'U' in FIG. 6 comprehensively expresses a configuration of the universal wheel driving system of the present disclosure except for the motor M and the input shaft IS.

The sun gear S is concentrically connected to the rotation axis of the motor M, i.e., the power source, by the input shaft IS, and the connected state is continuously maintained while driving of the vehicle.

In other words, as shown in FIG. 2, even when the wheel W and the ring gear R move upward and downward along curvature of the road surface, the sun gear S and the input shaft IS do not move upward and downward with respect to the vehicle body BD and continuously maintain the concentric state thereof.

The input shaft IS is connected to the sun gear S through the carrier C from the motor M; and the carrier C has a space portion SC providing a space to prevent interference between the carrier C and the input shaft IS.

In other words, even by upward and downward movements of the ring gear R and the wheel W with respect to the vehicle body BD, the motor M and the sun gear S maintain constant states without moving upward and downward with respect to the vehicle body BD. Therefore, to prevent the input shaft IS connecting the motor M and the sun gear S through the carrier C from interfering with the carrier C, the carrier C has the space portion SC.

The space portion SC may be provided by forming a hole in the carrier C as shown in the drawing, or by forming a groove therein.

According to the exemplary embodiments of the present disclosure, at least three suspension modules SM are provided to be spaced from each other in the circumferential direction of the sun gear S.

Furthermore, the suspension modules SM is extensibly provided between the sleeve SL rotatably supporting the input shaft IS and the carrier C in a radial direction of the sun gear S.

In other words, the sleeve SL is fixed to the vehicle body BD to support the input shaft IS, and is provided to allow a free rotation of the input shaft IS.

The suspension modules SM may include a shock absorber SB and a spring SR that are provided in parallel to each other between the sleeve SL and the carrier C.

Actually, as shown in FIG. 1, the suspension modules SM may include a strut in which the shock absorber SB and the spring SR are integrated with each other.

The carrier C, the ring gear R, and the wheel W are supported to the sleeve SL by the suspension modules SM as described above, and the sleeve SL is fixed to the vehicle body BD. As a result, the wheel W supports the vehicle against the road surface through the suspension modules SM, and impacts or vibrations of the road surface input from the wheel W to the carrier C through the ring gear R are transmitted to the vehicle body BD while being buffered and reduced by the suspension modules SM.

The speed of the motor M input to the sun gear S may be decelerated and the torque of the motor M be increased and transmitted to the ring gear R, so that the universal wheel driving system of the present disclosure is configured to excellently secure performance in uphill driving and accelerating driving.

Furthermore, as shown in FIG. 6, the motor M is not provided inside the wheel W into which severe impacts and vibrations are applied, but separately provided outside the wheel W, so that improvement in durability of the motor M and reduction of unsprung mass of a vehicle are possible and excellent ride comfort may be secured.

Furthermore, as described above, it is possible to allow upward and downward movements of the ring gear R connected to the wheel W with respect to the sun gear S connected to the power source and to achieve constant power transmission. Therefore, without using a conventional universal joint, etc., continuous power transmission from the power source is performed in response to vertical movements of the wheel W, whereby the utilization of a space between a left wheel W and a right wheel W may be excellently secured by reducing a space between the power source and the wheel W.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A universal wheel driving system comprising:
    a sun gear configured to receive power from a power source mounted to a vehicle body;
    a ring gear, of which a rotation axis is provided to move relatively to a rotation axis of the sun gear on a rotation plane parallel to a rotation plane of the sun gear, the ring gear being concentrically connected to a wheel;
    a gear train engaged to the sun gear and the ring gear and configured to allow relative movement between the rotational axes of the sun gear and the ring gear, and to generate a continuous power transmission state between the sun gear and the ring gear;
    a carrier configured to support a position of a rotation axis of a final pinion, which forms the gear train and is engaged with the ring gear, constant with respect to a position of the rotation axis of the ring gear; and
    at least one suspension module configured to provide shock-absorbing and damping during relative movements of the ring gear and the carrier with respect to the sun gear.

2. The universal wheel driving system of claim 1, wherein the gear train includes a plurality of links with a connected angle therebetween changed in response to a relative movement between the rotational axes of the sun gear and the ring gear.

3. The universal wheel driving system of claim 2,
    wherein the plurality of links includes a first link, a first end of which is connected to the rotation axis of the sun gear, and a second link connected to a second end of the first link, and
    wherein a joint pinion with a same number of teeth as the sun gear is provided at a connection portion of the second end of the first link and a first end of the second link.

4. The universal wheel driving system of claim 3,
    wherein the final pinion engaged with the ring gear is provided in a second end of the second link, and
    wherein the final pinion has a same number of teeth as the sun gear.

5. The universal wheel driving system of claim 4, wherein the final pinion is configured to transmit the power from the sun gear to the ring gear through a series of gears of the gear train through the joint pinion.

6. The universal wheel driving system of claim 4, wherein the gear train includes a plurality of gear trains provided along a circumferential direction of the sun gear.

7. The universal wheel driving system of claim 2,
    wherein the plurality of links includes a first link, a first end of which is connected to the rotation axis of the sun gear, and a second link connected to a second end of the first link, and
    wherein rotational axes of a series of gears in the gear train are provided in the first link and the second link to transmit the power from the sun gear to the ring gear.

8. The universal wheel driving system of claim 7, wherein among the series of gears forming the gear train, gears located at even-numbered positions from the sun gear have a same number of teeth as a number of teeth of the sun gear.

9. The universal wheel driving system of claim 8,
    wherein a gear located at a second position from the sun gear is a joint pinion provided concentrically with the second end of the first link and a first end of the second link, and
    wherein a gear located at a fourth position from the sun gear is the final pinion engaged with the ring gear.

10. The universal wheel driving system of claim 9,
    wherein the series of gears further includes a first intermediate pinion and a second intermediate pinion, wherein the first intermediate pinion of which a rotation axis is provided at a first position in the first link is engaged with the sun gear and the joint pinion, and wherein the second intermediate pinion of which a rotation axis is provided at a third position in the second link is engaged with the joint pinion and the final pinion.

11. The universal wheel driving system of claim 10, wherein the gear train includes a plurality of gear trains along a circumferential direction of the sun gear, and wherein each of final pinions of the gear trains is supported by the carrier so that relative movement therebetween is maintained constant and only rotation thereof is allowed.

12. The universal wheel driving system of claim 2, wherein the gear train further includes at least four gears sequentially engaged with each other, and wherein rotational axes of the at least four gears are rotatably supported by the plurality of links, respectively, the links being sequentially connected to each other.

13. The universal wheel driving system of claim 12, wherein the gear train is configured to maintain a relative phase of the sun gear and the ring gear constant with respect to relative movement of the rotational axes of the sun gear and the ring gear.

14. The universal wheel driving system of claim 13, wherein among the at least four gears including the final pinion, the final pinion engaged with the ring gear is configured to be supported by the carrier so that revolution of the at least four gears with respect to the sun gear is constrained and only rotation thereof is allowed.

15. The universal wheel driving system of claim 1, wherein the power source is fixed to the vehicle body, and wherein the sun gear is connected to the power source by an input shaft provided concentrically on a rotation axis of the power source.

16. The universal wheel driving system of claim 15, wherein the gear train includes a plurality of links with a connected angle therebetween changed in response to a relative movement between the rotational axes of the sun gear and the ring gear, and a plurality of final pinions are connected to the plurality of links, wherein each final pinion is supported by the carrier, wherein the input shaft is connected to the sun gear through the carrier, and wherein the carrier has a space portion providing a space to prevent interference between the carrier and the input shaft.

17. The universal wheel driving system of claim 16, wherein the at least one suspension module is provided between the carrier and a sleeve to which the input shaft is rotatably mounted, and is provided to be extendible in a radial direction of the sun gear.

18. The universal wheel driving system of claim 17, wherein the at least one suspension module includes a shock absorber and a spring that are provided in parallel with each other between the sleeve and the carrier.

19. The universal wheel driving system of claim 17, wherein the at least one suspension module includes at least three suspension modules provided to be spaced from each other in a circumferential direction of the sun gear.

20. The universal wheel driving system of claim 17, wherein the at least one suspension module is provided along a straight line connecting the rotation axis of the final pinion and a center portion of the sleeve.

21. The universal wheel driving system of claim 1, further including:

a sleeve fixed to the vehicle body, configured to support an input shaft transmitting the power to the sun gear, for allowing free rotation of the input shaft, wherein the at least one suspension module is provided between the sleeve and the carrier to provide shock-absorbing and damping when the ring gear and the carrier relatively move in vertical directions and longitudinal directions with respect to the vehicle body.

* * * * *